May 28, 1940.　　　　H. H. GORRIE　　　　2,202,286
CONTROL SYSTEM

Original Filed Feb. 25, 1935

INVENTOR.
HARVARD H. GORRIE
BY Raymond D. Junkins
ATTORNEY

Patented May 28, 1940

2,202,286

UNITED STATES PATENT OFFICE 2,202,286

CONTROL SYSTEM

Harvard H. Gorrie, Cleveland Heights, Ohio, assignor to Bailey Meter Company, a corporation of Delaware Original application February 25, 1935, Serial No. 8,047, now Patent No. 2,098,914, dated November 9, 1937. Divided and this application April 19, 1937, Serial No. 137,667

20 Claims. (Cl. 137—153)

This invention relates to control systems for establishing or maintaining substantially constant any desired electrical, thermal, chemical, physical or other variable condition through the control of a corrective agent or agents. More particularly my invention relates to control systems wherein a fluid pressure is utilized as the motive power for actuating devices to control the rate of application of corrective agents.

It is an object of my invention to provide a control system wherein the condition under control is rapidly restored to a predetermined value, upon deviation therefrom, without over-travel or hunting.

A further object of my invention is to provide a control system wherein the control of the pressure fluid by a device sensitive to the controlled condition may be readily transferred to manually-operated devices without setting up disturbances in the system.

A further object is to provide a control system wherein individual units, each contributing to the production of the controlled condition may be operated at different rates, one from another, and wherein the control of the rate of supply of an agent, or agents, by the controlled condition to each unit is modified to maintain such units at highest operating efficiency.

The present application constitutes a division of my application, Serial No. 8,047, filed February 25, 1935, in the United States Patent Office, now Patent No. 2,098,914, granted November 9, 1937, and is directed particularly to the selector valve, or mechanism, through whose agency an operator may manually control or may selectively put the control on an automatic basis.

These and other objects will be apparent from the following description and the drawing in which.

Figure 1:
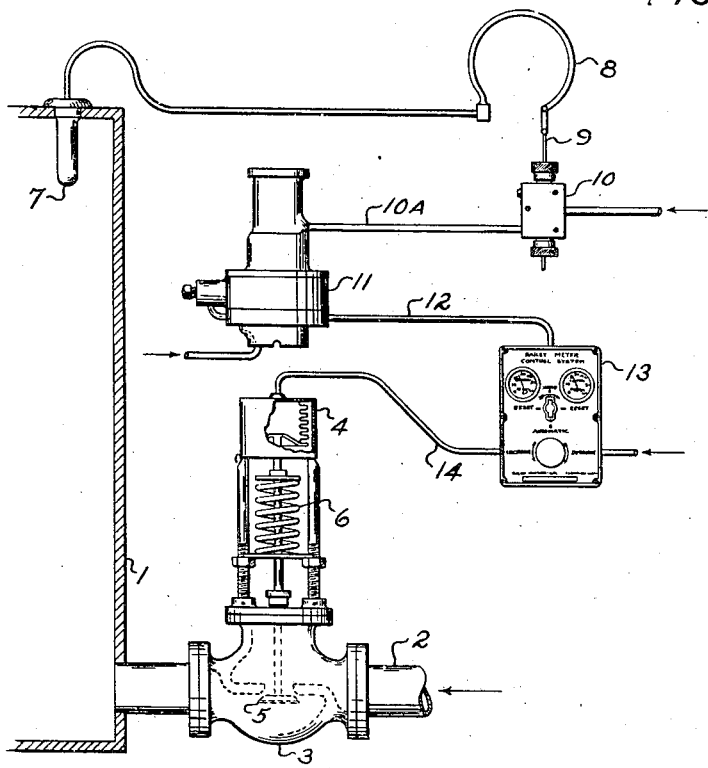
Fig. 1 is a diagrammatic representation of a control system embodying my invention.

Referring to Fig. 1, I have therein shown my control system utilized to maintain a predetermined temperature within a tank 1, which is supplied with a heating agent such as steam through a conduit 2. For regulating the flow of steam to the tank a valve 3 is located in the conduit 2 and actuated by a pressure fluid motor 4. As shown the pressure fluid motor 4 is effective for positioning a movable valve member 5 against the progressively increasing resistance of a spring 6 as the pressure of the fluid supplied the motor 4 increases.

Within the tank 1 may be disposed the bulb 7 of a temperature sensitive device having a Bourdon tube 8 adapted to position a movable valve member 9 of a pilot valve 10 to establish a fluid pressure in accordance with the temperature within the tank 1. This pressure is in turn effective through the agency of a standardizing or pressure balancing relay 11 for establishing a loading pressure normally governing the actuation of the motor 4. The loading pressure is conducted through a pipe 12 to a selector valve 13 wherein it is effective for establishing a control pressure transmitted through the pipe 14 to the motor 4. The arrangement is such that as the temperature within the tank 1 increases, the pressure transmitted to the standardizing device 11 through the agency of the pilot 10 is proportionately decreased, thereby effecting a movement of the valve member 5 in a closing direction to decrease the rate of flow of steam to the tank 1.

The selector valve 13 is provided with suitable manually-operated valves and mechanisms whereby control of the motor 4 may readily be transferred from the loading pressure established by the standardizing relay 11 to a loading pressure established by an operator or attendant.

The pilot valve 10 is more fully disclosed, and is claimed, in the patent to Johnson, No. 2,054,464, granted September 15, 1936. It is sufficient for the present disclosure to say that a loading pressure is established in the pipe 10A in proportion to or in relation to the temperature to which the Bourdon tube 8 is sensitive.

The relay mechanism 11 is more fully disclosed and is claimed in the parent application, Serial No. 8,047, now Patent No. 2,098,914, of which the present application is a division. Suffice it to say that a loading pressure is effective in the pipe 12 leading to the selector switch 13 and from which latter a pipe 14 goes to the fluid pressure motor 4. The present application, being primarily concerned with the selector switch 13, is not particularly interested in the origin or magnitude of the loading pressure existing in the pipe 12 or that which may exist in the pipe 14. Except that insofar as the pressure which exists in the pipe 14 is concerned this is selectively that of the pipe 12 or as established manually through the agency of the selector valve mechanism.

Figure 2:
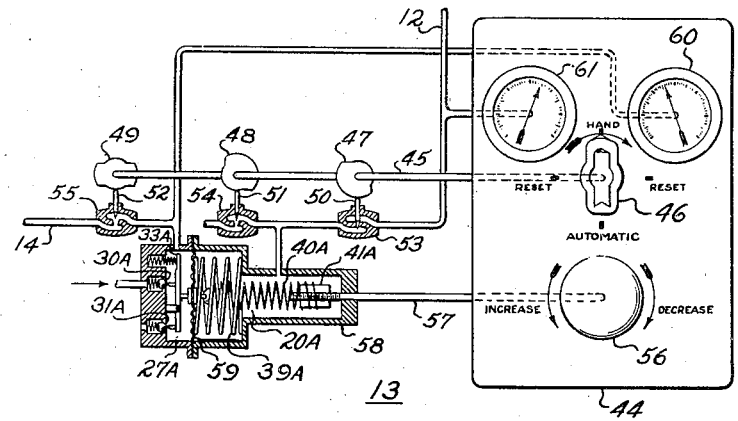
Fig. 2 is a schematic illustration partially in section of a selector switch utilized in my invention.

In Fig. 1 I have shown the controlling fluid pressure conducted from the standardizing or pressure balancing relay 11 through a pipe 12 to a selector switch 13, which provides a convenient means for readily transferring control of the motor 4 either partially or entirely from the controlled condition to manual control. In Fig. 2 I have schematically illustrated the selector valve 13 provided with a suitable mounting plate 44, readily fastened to a panel or other mounting means. Journaled in the mounting plate 44 and extending rearwardly therefrom is a cam shaft 45, to which is secured a hand operable valve switch 46. Suitably arranged on the cam shaft are cams 47, 48 and 49 for positioning the movable valves 50, 51 and 52 of valve bodies 53, 54 and 55 respectively. On the mounting plate 44 may be inscribed suitable legends for indicating the existing status of the control system and directions for transferring the control from automatic to hand, or vice versa. As shown, the valve switch 46 is in the "hand" position, indicating that the valves 50, 51 and 52 are positioned so that the controlling pressure transmitted to the valve 3 may be varied manually entirely independent of the loading pressure produced by the standardizing relay 11; by angularly positioning a knob 56. As indicated by the legend angular positioning of the knob 56 in a clockwise direction decreases the controlling pressure whereas counter-clockwise positioning increases the controlling pressure.

Manual positioning of the knob 56 serves to actuate a relay 58, which in many aspects is similar to the standardizing or pressure-balancing relay 11 hereinbefore described. The knob 56 is secured to a shaft 57 journaled in the mounting plate 44, and passes through the wall of the relay 58. The relay 58 is divided into two chambers 20A and 27A by a diaphragm 59. Positioned in the chamber 20A is a compression spring 39A urging the diaphragm 59 in one direction. Likewise positioned in the chamber 20A is a tension spring 40A fastened to the diaphragm 59 and to a longitudinally movable block 41A, and urging the diaphragm 59 in the opposite direction. The movable block 41A is threaded to the shaft 57 and upon angular positioning of the shaft 57 is moved longitudinally in the chamber 20A, thus increasing or decreasing the tension of the spring 40A. When the knob 56 is angularly positioned in a clockwise direction the movable block 41A is moved to the right, as viewed in the drawing, thus increasing the tension of the spring 40A, and reducing the net force of the springs 39A and 40A against the diaphragm 59.

Located in the chamber 27A is a fulcrumed beam 33A adapted to actuate a pressure fluid inlet valve 30A when displaced from the neutral position in a counter-clockwise direction, or to actuate a pressure fluid exhaust valve 31A when displaced from the neutral position in a clockwise direction. Pressure fluid admitted to the chamber 27A is effective for maintaining the diaphragm 59 in a neutral position and is transmitted through the valve 55 to the pipe 14 for actuating the motor 4.

The movable valve member 50 controlling the ingress of fluid pressure from the pipe 12 to the chamber 20A is shown in the closed position, whereas the movable valve member 51, permitting egress of the pressure fluid within the chamber 20A to the atmosphere, is open. Accordingly the force urging the diaphragm 59 to the left, as viewed in Fig. 2, is that produced by the springs 39A and 40A. If for example it is desired to reduce the fluid pressure effective on the motor 4, the hand operable knob 56 is rotated in a clockwise direction, thus increasing the tension of the spring 40A, but reducing the net force urging the diaphragm 59 to the left. Accordingly the pressure necessary to produce an equal but opposite force to maintain the fulcrumed beam 33A in the neutral position is reduced, and the fulcrum beam 33A is displaced clockwise actuating the valve member 31A allowing the pressure within the chamber 27A to decrease until it is in proportion to the force produced by the springs 39A, 40A. Further displacement of the knob 56 effects a further decrease in fluid pressure necessary to maintain the diaphragm 59 in the neutral position, and the relay 58 provides a convenient manually-operable means for varying the fluid pressure effective upon the motor 4 through any range desired.

In order that the operator may be advised of the position of the valve 5 at all times, a pressure gage 60 may be provided, which is connected to the chamber 27A. As the valve 5 is positioned in accordance with the pressure fluid transmitted to the motor 4 from the chamber 27A an indication of such pressure is in reality an indication of the position of valve 5, and the gage 60 may if desired be graduated to indicate valve position. An operator thus manually adjusting the control system is continuously and instantaneously advised of changes in the rate of application of the corrective agent.

When it is desired to transfer the means regulating the rate of application of the corrective agent from hand to automatic control, the transfer switch 46 is rotated 90° in the direction indicated by the arrow to the "reset" position. Such rotation effects an opening of the valve 53, and a closure of the valves 54 and 55. Pressure variations from the standardizing relay 11 are thus transmitted through the pipe 12 to the chamber 20A and are effective upon the diaphragm 59. The magnitude of the pressure within the pipe 12 is indicated by a gage 61. An operator may then observe the difference between the loading pressure produced by the standardizing relay 11 and that which will be made effective upon the motor 4 by determining the difference between the readings of the gages 60 and 61. In order that the transfer from hand to automatic control may be made as smoothly as possible without causing disturbances in the system it is desirable that the difference in the loading pressure transmitted through the pipe 12 and that which will be made effective upon the motor 4 through the pipe 14, be as small as possible before the transfer is made. Thus with the transfer switch in the reset position an operator is given an opportunity to determine this difference, and by proper manipulation of the knob 56 may make the pressures identical before making the transfer.

Further displacement of the transfer switch 46 from the reset position to the automatic position permits the valve 53 to remain open, the valve 54 to remain closed, but opens the valve 55, thus permitting pressures within the chamber 27A to be transmitted through the pipe 14 to the motor 4 and variations in loading pressure conducted through the pipe 12 to the chamber 20A will thereafter produce corresponding variations in the controlling pressure transmitted to the motor 4. If desired the controlling pressure transmitted to the motor 4, may be increased above or decreased below the loading pressure established in the chamber 20A by manual operation of the knob 56, which thus provides a means for modifying the control of the rate of application of the producing agent by the controlled condition to compensate or correct, for example, for variations in the thermal content, chemical constituents, etc., of the producing agent.

In transferring from automatic to hand control it is also desirable that the operation be accomplished without undue disturbance in the control system or in the apparatus to which it is applied. To accomplish this a reset position is provided as shown between the automatic and hand positions. In this reset position valve 55 is closed, valve 54 is opened, allowing the pressure fluid within the chamber 20A to exhaust; and valve 53 is closed. The knob 56 may then be manipulated until the controlling pressure is substantially the same as existed immediately prior to the transfer switch 46 being moved from the automatic position to the reset position; and as the valve 55 is closed such adjustment may be made without disturbing the position of the valve 5. After the controlling fluid pressure has been brought to the desired value by manipulation of the knob 56, the transfer switch may be turned to the "hand" position, with the assurance that the valve 5 will not be positioned suddenly from its former position.

While in the foregoing description I have used specific apparatus to illustrate my invention, it is to be understood that I am not to be limited thereby, but that my invention is applicable to a wide variety of applications.

What I claim as new, and desire to secure by Letters Patent of the United States, is:

1. The method of transferring control of a pressure fluid actuated device from a first fluid pressure to a second fluid pressure which comprises rendering said device insensitive to changes in the first fluid pressure, determining the magnitude of the first fluid pressure, making the second fluid pressure substantially equal to the first fluid pressure, and rendering the device sensitive to changes in the second fluid pressure.

2. The method of transferring control of a device actuated by a regulating fluid pressure produced by a pressure relay normally sensitive to a controlling fluid pressure to manual control, which comprises, isolating the relay, determining the magnitude of the controlling fluid pressure, adjusting the relay to produce a pressure substantially equal to the controlling fluid pressure, and rendering the relay accessible to the regulating fluid pressure.

3. In a fluid pressure actuated control system wherein a controlling fluid pressure produces a regulating fluid pressure for actuating a device through the agency of a relay having a controlling pressure fluid chamber and a regulating pressure fluid chamber, the method of transferring from automatic to hand control which comprises, disconnecting the controlling and the regulating chambers from the controlling and the regulating fluid pressures, exhausting the controlling pressure fluid chamber, determining the magnitude of the controlling fluid pressure, producing in the regulating chamber a pressure substantially equal to the controlling fluid pressure, and connecting the regulating chamber to the regulating fluid pressure.

4. In a fluid pressure actuated control system wherein a controlling fluid pressure produces a regulating fluid pressure for actuating a device through the agency of a relay having a controlling pressure fluid chamber and a regulating pressure fluid chamber, the method of transferring from hand to automatic control which comprises, determining the magnitude of the regulating fluid pressure, disconnecting the regulating chamber from the regulating fluid pressure and connecting the controlling chamber to the controlling fluid pressure, adjusting the relay to produce a pressure in the regulating chamber substantially equal to the determined magnitude of the regulating fluid pressure, and connecting the regulating chamber to the regulating pressure.

5. A selector valve for a fluid pressure operated control system, comprising in combination, separate pressure lines, a pressure relay for transmitting pressure variations from one of said pressure lines to the other of said pressure lines, valve means positioned in each of said lines for controlling the transmittal of pressure, and means for progressively operating said valves in a predetermined cycle.

6. A selector valve comprising in combination, a pressure relay, a pipe for conducting a controlling fluid pressure to said relay, a pipe for transmitting the controlled fluid pressure from said relay, hand operable means for modifying the control of said controlled fluid pressure by said controlling fluid pressure, valve means for controlling the transmittal of the controlling fluid pressure to said relay, valve means for controlling the transmittal of the controlled fluid pressure from said relay, a relief valve positioned between said first named valve and said relay, and hand operable means for progressively operating said valves in unison through a predetermined cycle.

7. A selector valve comprising in combination, a pressure relay, a first pipe for conducting a controlling fluid pressure to said relay, a first valve for controlling the transmittal of the controlling fluid pressure to said relay, a first pressure gage for indicating the magnitude of the controlling fluid pressure connected to said first pipe ahead of said first valve, a second pipe for conducting the controlled fluid pressure from said relay, a second valve for controlling the transmittal of the controlled fluid pressure from said relay, a second pressure gage for indicating the magnitude of the controlled fluid pressure connected to said second pipe between said relay and said second valve, and hand operable means for progressively operating said valves in unison through a predetermined cycle.

8. A selector valve comprising in combination, a pressure relay, a first pipe for conducting a controlling fluid pressure to said relay, a first pressure gage for indicating the magnitude of the controlling fluid pressure connected to said first pipe ahead of said first valve, a relief valve positioned between said first valve and said relay, a second pipe for conducting the controlled fluid pressure from said relay, a second valve for controlling the transmittal of the controlled fluid pressure from said relay, a second pressure gage for indicating the magnitude of the controlled fluid pressure connected to said second pipe between said relay and said second valve, manually operable means movable to a plurality of successive positions for operating said valves in unison through a predetermined cyclic program, said manually operable means in one position maintaining said first and second valves open and said relief valve closed whereby variations in the controlling fluid pressure effect corresponding variations in the controlled fluid pressure, when moved to a second position simultaneously closing said first and second valves and opening said relief valve, when moved to a third position opening said second valve while maintaining said relief valve and said first valve open, and when moved to a fourth position simultaneously closing said second valve and said relief valve and opening said first valve; and manually operable means for varying the magnitude of the controlled fluid pressure.

9. A selector valve comprising in combination, a pressure relay, a pipe for conducting a controlling fluid pressure to said relay, a pipe for transmitting the controlled fluid pressure from said relay, hand operable means for modifying the control of said controlled fluid pressure by said controlling fluid pressure, valve means for controlling the transmittal of the controlling fluid pressure to said relay, valve means for controlling the transmittal of the controlled fluid pressure from said relay, and hand operable means for progressively operating said valves in unison through a predetermined cycle.

10. A selector valve comprising in combination, a pressure relay, a pipe for conducting a controlling fluid pressure to said relay, a pipe for transmitting the controlled fluid pressure from said relay, valve means for controlling the transmittal of the controlling fluid pressure to said relay, valve means for controlling the transmittal of the controlled fluid pressure from said relay, and hand operable means for progressively operating said valves in unison through a predetermined cycle.

11. A selector valve for a fluid pressure operated control system comprising in combination, separate pressure lines, a pressure relay for transmitting pressure variations from one of said pressure lines to the other of said pressure lines, valve means positioned in each of said lines for controlling the transmittal of pressure, a cam shaft, a plurality of cams mounted on said shaft, each of said cams adapted to actuate one of said valve means, and hand operable means for angularly positioning said cam shaft whereby said valves are progressively operated in unison through a predetermined cycle.

12. A selector valve comprising in combination, a pressure relay, a pipe for conducting a controlling fluid pressure to said relay, a pipe for transmitting the controlled fluid pressure from said relay, hand operable loading means for varying the magnitude of the controlled fluid pressure for a given magnitude of the controlling fluid pressure, valve means for controlling the transmittal of the controlling fluid pressure to said relay, and hand operable means for opening and closing said valve means whereby when said valve means is in closed position variations in the controlled fluid pressure being produced solely by said hand operable loading means, and when said valve means is in open position variations in the controlled fluid pressure being produced by said hand operable means and said controlling fluid pressure.

13. A selector valve comprising in combination, a pressure relay, a pipe for conducting a controlling fluid pressure to said relay, a pipe for transmitting the controlled fluid pressure from said relay, hand operable loading means for varying the magnitude of the controlled fluid pressure for a given magnitude of the controlling fluid pressure, a first valve for controlling the transmittal of the controlling fluid pressure to said relay, a relief valve positioned between said first named valve and said relay, means for closing said first valve and simultaneously opening said relief valve whereby said hand operable loading means solely controls the magnitude of the controlled fluid pressure.

14. The method of transferring control of a pressure fluid actuated device from a first fluid pressure to a second fluid pressure which comprises rendering said device insensitive to changes in the first fluid pressure, making the second fluid pressure substantially equal to the first fluid pressure impressed on said device, and rendering the device sensitive to changes in the second fluid pressure.

15. The method of transferring control of a device actuated by a regulating fluid pressure produced by a pressure relay normally sensitive to a controlling fluid pressure to manual control, which comprises, isolating the relay, adjusting the relay to produce a pressure substantially equal to the regulating fluid pressure, and rendering the relay accessible to the regulating fluid pressure.

16. A selector valve for transferring control of a pressure fluid actuated device from a first fluid pressure to a second fluid pressure comprising a manually operable valve means for selectively rendering said device sensitive to changes in said first fluid pressure, manually operable means for establishing said second fluid pressure, and manually operable valve means for selectively rendering said device sensitive to said second fluid pressure.

17. A selector valve for transferring control of a pressure fluid actuated device from a first fluid pressure to a second fluid pressure comprising in combination, valve means for rendering said device selectively insensitive or sensitive to changes in said first fluid pressure, manually operable means for establishing said second fluid pressure, valve means for selectively rendering said device insensitive or sensitive to said second fluid pressure, and hand operable means for progressively operating said valves in unison through a predetermined cycle.

18. Control apparatus for effecting control of a variable by fluid pressure transmission and arranged for alternative automatic or manual control, comprising means to adjust the fluid pressure established by the control to which change is to be made as to cause the said control to produce a pressure substantially equal to that produced by the control from which change is to be made.

19. In control apparatus effecting control of a device by fluid pressure transmission, a selector valve providing for selective control of the fluid pressure by manual or automatic means, said selector valve comprising means to adjust the fluid pressure established by the control to which change is to be made so that the fluid pressure established thereby is substantially equal to that produced by the control from which change is to be made.

20. In control apparatus effecting control of a device by fluid pressure transmission, a selector valve providing for selective control of the fluid pressure by manual or automatic means, said selector valve comprising means to prevent changes in said fluid pressure by either said automatic or manual means, and means to adjust the fluid pressure established by the control to which change is to be made so that the fluid pressure established thereby is substantially equal to that produced by the control from which change is to be made.

HARVARD H. GORRIE.